(12) United States Patent
Avalos et al.

(10) Patent No.: US 10,270,950 B2
(45) Date of Patent: Apr. 23, 2019

(54) IR BLOCKING LENS HOLDER

(71) Applicant: Robert Bosch GmbH, Stuttgart (DE)

(72) Inventors: Hiram Avalos, Detroit, MI (US); Ligor Manushi, Northville, MI (US); Mark Ryskamp, Gross Pointe Park, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/387,087

(22) Filed: Dec. 21, 2016

(65) Prior Publication Data
US 2018/0176429 A1 Jun. 21, 2018

(51) Int. Cl.
| | | |
|---|---|---|
| H04N 5/225 | (2006.01) | |
| G02B 7/02 | (2006.01) | |
| G02B 27/00 | (2006.01) | |
| B29C 65/16 | (2006.01) | |
| B29C 65/00 | (2006.01) | |
| B29L 31/34 | (2006.01) | |

(52) U.S. Cl.
CPC ....... *H04N 5/2254* (2013.01); *B29C 65/1612* (2013.01); *B29C 65/1635* (2013.01); *B29C 66/112* (2013.01); *B29C 66/114* (2013.01); *B29C 66/131* (2013.01); *B29C 66/5344* (2013.01); *B29C 66/54* (2013.01); *G02B 7/02* (2013.01); *G02B 27/0025* (2013.01); *B29K 2995/0027* (2013.01); *B29L 2031/3481* (2013.01)

(58) Field of Classification Search
None
See application file for complete search history.

(56) References Cited

U.S. PATENT DOCUMENTS

| | | | |
|---|---|---|---|
| 7,388,718 B2 | 6/2008 | Makii et al. | |
| 7,561,354 B2 | 7/2009 | Lin | |
| 7,944,633 B2 | 5/2011 | Shyu et al. | |
| 8,345,362 B2 | 1/2013 | Hou | |
| 9,277,104 B2* | 3/2016 | Sesti | G02B 7/025 |
| 2006/0049154 A1* | 3/2006 | Clifford, Jr. | B29C 65/1635 219/121.64 |
| 2010/0157448 A1 | 6/2010 | Chen | |
| 2011/0298968 A1* | 12/2011 | Tseng | G02B 27/62 348/373 |
| 2013/0113062 A1 | 5/2013 | Yang et al. | |
| 2013/0308048 A1* | 11/2013 | Park | H04N 5/2254 348/374 |
| 2014/0307341 A1 | 10/2014 | Uno et al. | |
| 2016/0100082 A1 | 4/2016 | Schack et al. | |

FOREIGN PATENT DOCUMENTS

| | | | |
|---|---|---|---|
| KR | 2009122593 A | * | 12/2009 |
| KR | 20150058950 A | * | 5/2015 |

OTHER PUBLICATIONS

English translation of KR 2009122593, A Dong-Kyun L, Dec. 2009.*
European Extended Search Report for Application No. 17206167.3 dated May 4, 2018 (7 pages).

* cited by examiner

*Primary Examiner* — James M Hannett
(74) *Attorney, Agent, or Firm* — Michael Best & Friedrich LLP

(57) ABSTRACT

A lens holder including a first portion made of a first plastic material capable of being laser welded to an imager assembly. The lens holder further includes a second portion made of a second plastic material capable of blocking infrared radiation. The first portion and the second portion are coupled together in nested relation.

22 Claims, 4 Drawing Sheets

IR BLOCKING LENS HOLDER

BACKGROUND

The present invention relates to lens holders for cameras, specifically lens holders capable of blocking infrared radiation.

Infrared radiation can interfere with cameras, especially the lens assembly, producing images that appear foggy with a white tint. Accordingly, camera assemblies need to account for the interference from infrared radiation. Lens holders can be metallized (e.g., chrome plated) internally during assembly. This internal metallization of the lens holder is capable of blocking infrared radiation.

Laser welding is used to join parts in high volume, automated applications, such as in the automotive industry. Plastic materials that are laser welded need to be optically transmissive in order for the welding process to function properly. The infrared spectrum (i.e., wavelength of 700 nm to 1 mm) is capable of passing through these optically transmissive materials. Therefore, these optically transmissive materials are incapable of blocking infrared radiation. Further, metallized portions of lens holders, which block the transmission of infrared radiation, are incapable of being properly laser welded.

SUMMARY

In one exemplary embodiment, the invention provides a lens holder including a first portion made of a first plastic material capable of being laser welded to a camera assembly. The lens holder further includes a second portion made of a second plastic material capable of blocking infrared radiation. The first portion and the second portion are coupled together in nested relation.

In another exemplary embodiment, the invention provides a method of producing a lens holder. The method includes molding a first portion from a first plastic material capable of being laser welded to a camera assembly. The method further includes molding a second portion from a second plastic material capable of blocking infrared radiation. Additionally, the method includes coupling the first portion and the second portion together in nested relation.

Other aspects of the invention will become apparent by consideration of the detailed description and accompanying drawings.

DETAILED DESCRIPTION

Figure 3:
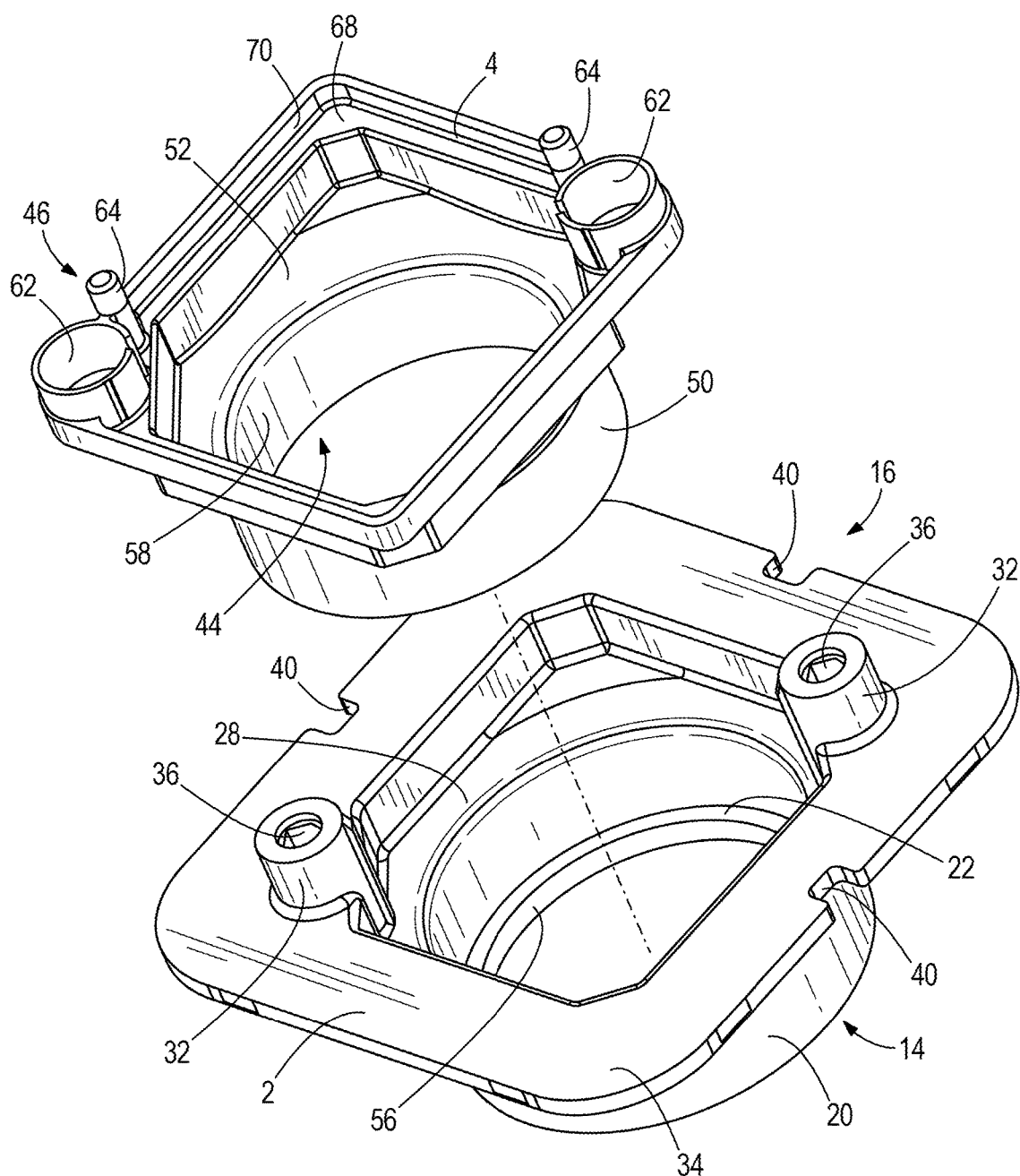
FIG. 3 is an exploded view of the exemplary lens holder of FIG. 1.
Figure 4:
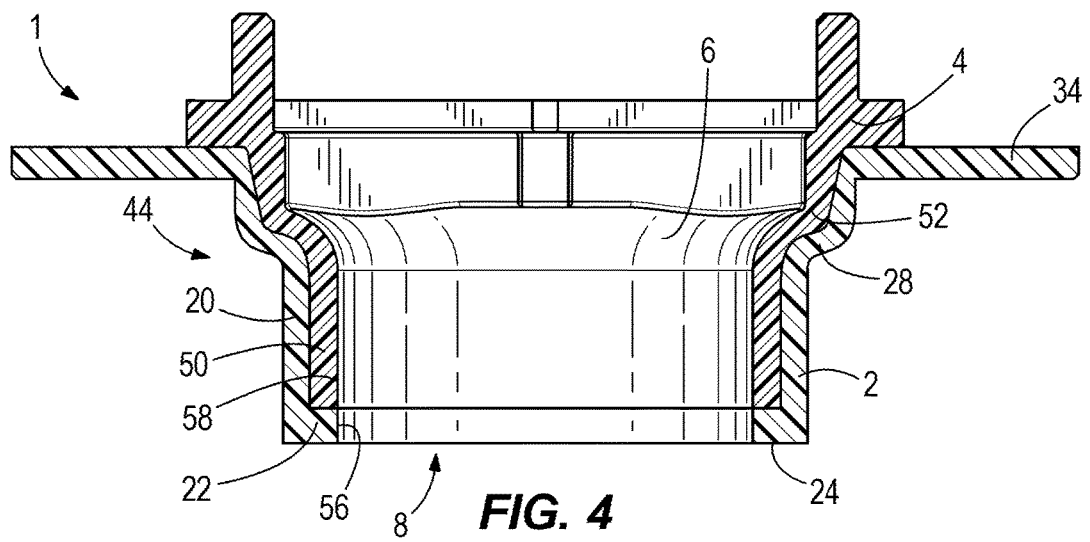
FIG. 4 is a sectional side view of the exemplary lens holder of FIG. 1.
Figure 5:
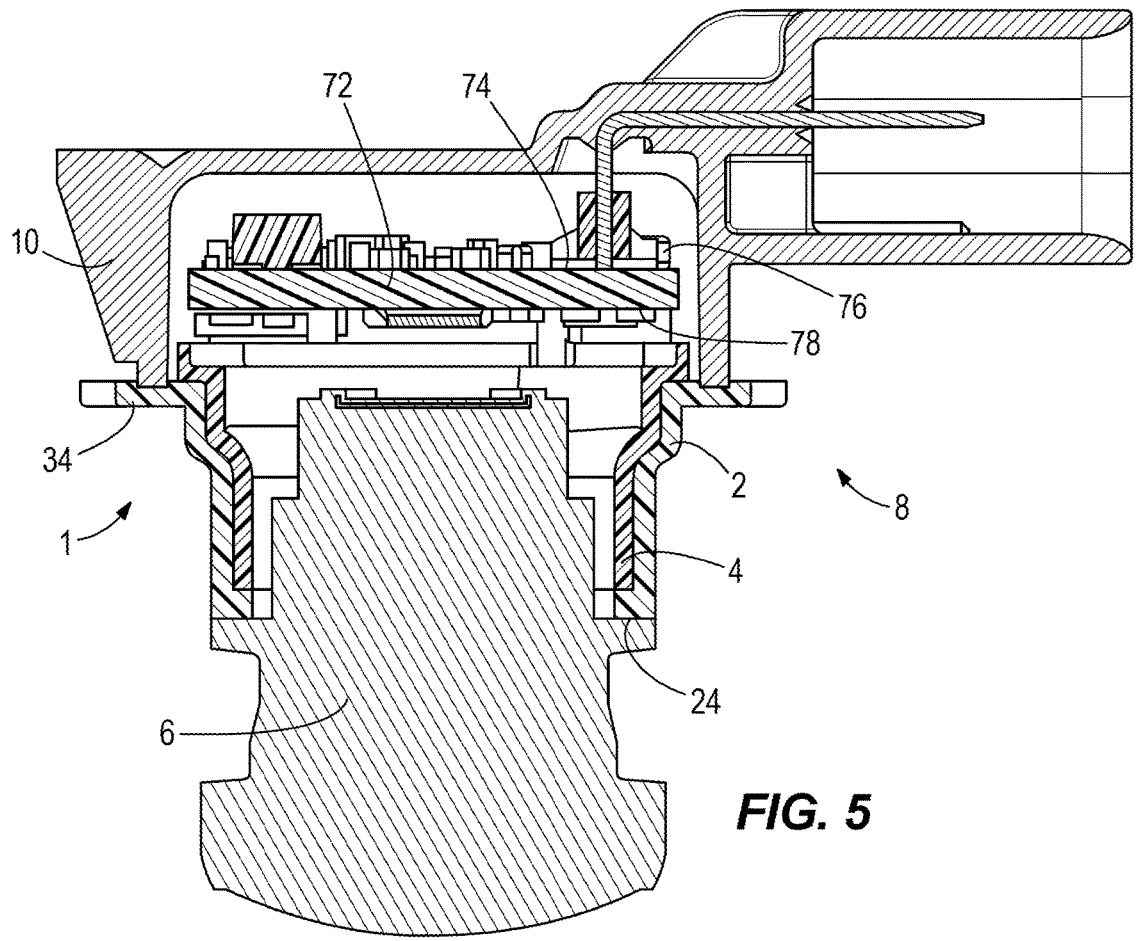
FIG. 5 is a sectional side view of an exemplary lens holder fixed to a camera assembly.

FIGS. 1-5 illustrate and describe an exemplary lens holder 1. The lens holder 1 is formed from two portions, which could be initially separate portions that are coupled together, and which could include portions that are formed sequentially and chemically bonded together during manufacturing such that they are only separate portions for a very short time during manufacturing. A first portion 2 is molded from a plastic material capable of being laser welded to a camera assembly 8. A second portion 4 is molded from a plastic material capable of blocking infrared radiation. The first and second portions 2, 4 of the lens holder 1 can be made from a variety of plastic materials (e.g., nylon, PBT-GF30, polythene, polypropylene, etc.). The first portion 2 is optically transmissive enough to allow for short-wavelength infrared radiation to pass virtually unhindered through the material. For example, the first portion 2 can use optically transmissive PBT-GF30, allowing for a laser to pass through the first portion 2 and create a laser weld joint between the lens holder 1 and a housing 10 of the camera assembly 8 (FIG. 5). The second portion 4 contains materials capable of blocking infrared radiation. For example, the second portion 4 can be made of a plastic material containing carbon black that is capable of blocking infrared radiation.

Figure 1:
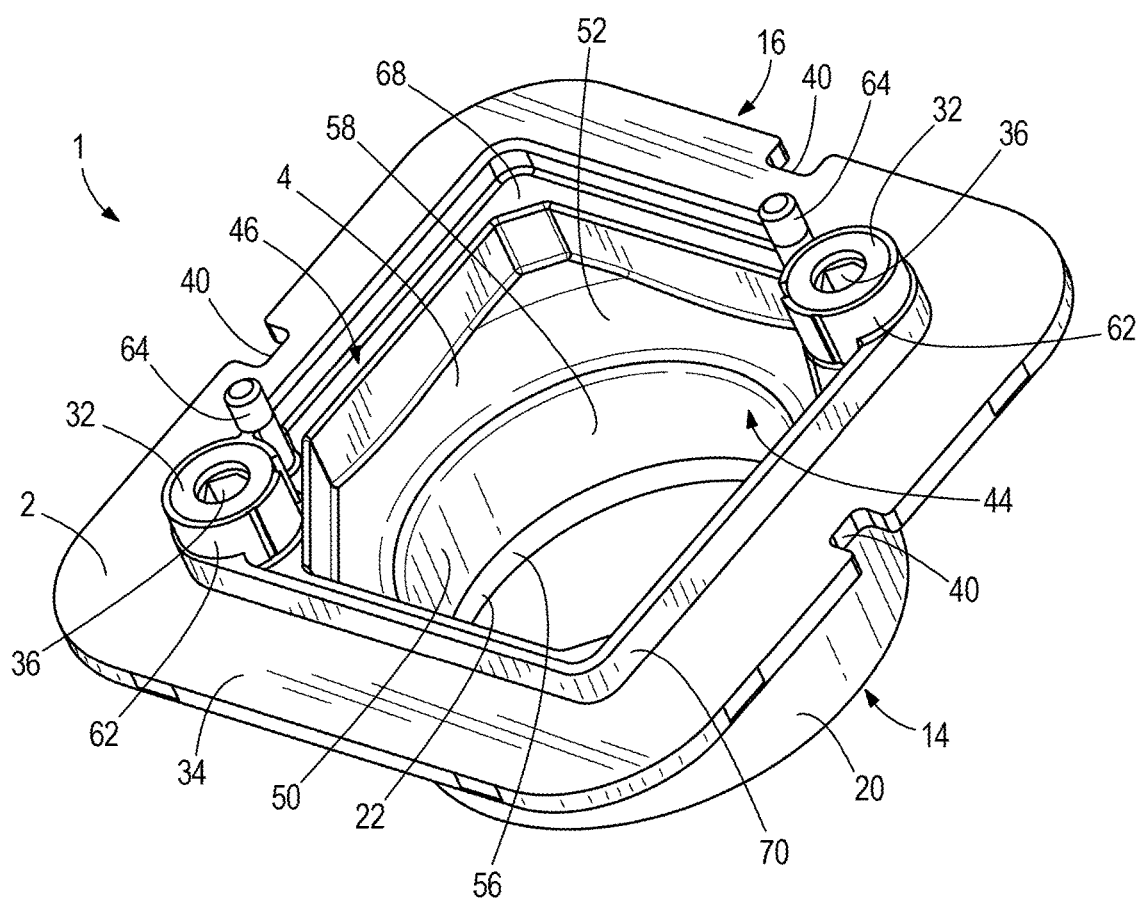
FIG. 1 is a perspective top view of an exemplary lens holder embodying the invention.
Figure 2:
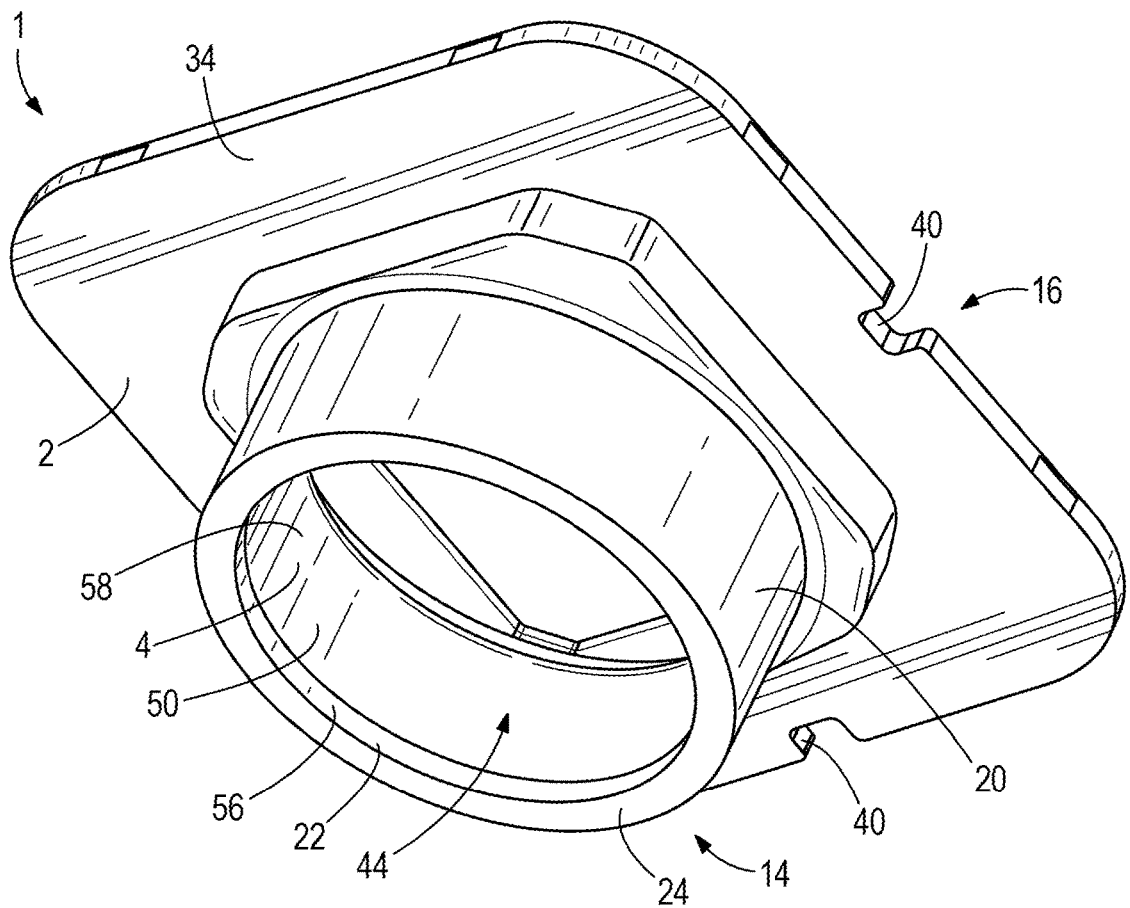
FIG. 2 is a perspective bottom view of the exemplary lens holder of FIG. 1.

FIGS. 1-3 illustrate an exemplary embodiment of the lens holder 1 having the first portion 2 and the second portion 4 molded such that the first and second portions 2, 4 are coupled together in a nested relation. When coupled, the second portion 4 is arranged (e.g., nests) inside of the first portion 2. As shown in FIGS. 4 and 5, this configuration allows for the second portion 4 to protect a lens assembly 6 of the camera assembly 8 from infrared radiation, while at the same time allowing the first portion 2 to be laser welded to the housing 10 and the lens assembly 6 of the camera assembly 8. The lens holder 1 according to this invention can be used in any camera assembly used in a variety of applications, such as, but not limited to, vehicular back-up cameras.

As shown in FIGS. 1-3, the first portion 2 includes a receiving section 14 and an attachment section 16. The receiving section 14 has a cylindrical body 20 with a shoulder 22 configured to receive and support the second portion 4 of the lens holder 1. A distal or bottom portion 24 of the cylindrical body 20 is configured to be laser welded to the lens assembly 6 of the camera assembly 8, as shown in FIG. 5. The receiving section 14 further includes a shelf or transition portion 28 configured to abut and further support the second portion 4. The illustrated shelf 28 provides a transition between the cylindrical body 20 and the generally rectangular-shaped attachment section 16. In other embodiments, the shelf 28 can be annularly-shaped to transition between different diameters of the cylindrical body 20 and a more circular-shaped attachment section (not shown).

In the exemplary lens holder 1 illustrated in FIGS. 1-3, the attachment section 16 includes two bosses 32 and a flange 34. The bosses 32 are positioned on and extend from opposing sides of the shelf 28 of the receiving portion 14. Other embodiments may include fewer than or more than two bosses 32. The bosses 32 each have a hole 36. For example, the bosses 32 can be screw bosses configured to receive a fastener (i.e., a screw) in the hole 36. As shown in FIGS. 1-3, the flange 34 is generally rectangular-shaped with notches 40 on three sides. The notches 40 can be used for alignment in the attachment of the lens holder 1 to a vehicle (not shown) or for alignment during the molding process. Other embodiments may have a flange having various shapes, with or without notches. As shown in FIG. 5, the flange 34 is configured to be laser welded to the housing 10 of the camera assembly 8. FIG. 5 shows the upper portion of the flange 34 engaged and laser welded to the housing 10 of the camera assembly 8. In other embodiments, the flange 34 can be laser welded to the housing 10 in various locations of the flange 34. For example, the edges or the bottom portion of the flange 34 can be laser welded to the housing 10 of the camera assembly 8.

As shown in FIGS. 1-3, the second portion 4 of the lens holder 1 includes a lens receiving section 44 and an attachment section 46. The lens receiving section 44 has a cylindrical body 50 and a shelf or transition portion 52 that correspond to the cylindrical body 20 and shelf 28, respectively, of the first portion 2. The cylindrical body 50 of the second portion 4 is received in the cylindrical body 20 of the first portion 2 in nested relation when the first and second portions 2, 4 are coupled together. More specifically, the distal end of the cylindrical body 50 of the lens receiving section 44 abuts and is supported on the shoulder 22 of the first portion 2 such that a radially inner surface 56 of the shoulder 22 is flush with a radially inner surface 58 of the cylindrical body 50 when the first portion 2 is coupled to the second portion 4. The shelf 52 of the second portion 4 abuts the shelf 28 of the first portion 2 when the first and second portions 2, 4 are coupled together in nested relation.

The attachment section 46 of the second portion 4 includes two through holes 62, two alignment pins 64, and an upper shelf 68 having a surrounding wall 70. The through holes 62 correspond with the bosses 32 of the first portion 2 and are arranged on opposing sides of the upper shelf 68. The alignment pins 64 are also arranged on opposing sides of the upper shelf 68. Other embodiments may include fewer than or more than two through holes 62 and fewer than or more than two alignment pins 64. The bosses 32 of the first portion 2 are received within the corresponding through holes 62 of the second portion 4 when the first and second portions 2, 4 are coupled together in nested relation. The alignment pins 64 are configured to align the lens holder 1 with the camera assembly 8 during attachment of the lens holder 1 to the camera assembly 8.

As shown in FIG. 5, the camera assembly 8 further includes a circuit board 72 arranged within the housing 10. The circuit board 72 can be coupled to the lens holder 1. For example, fasteners 76 can be received in a through hole (not shown) at a portion 74 of the circuit board 72 aligned with the bosses 32 and tightened in the holes 36 of the bosses 32 to secure the circuit board 72 to the lens holder 1. FIG. 5 illustrates the lens holder 1 secured to the circuit board 72 by a fastener 76 (e.g., a screw) tightened within the lens holder 1 such that the head of the fastener 76 abuts the portion 74 of the circuit board 72. In other embodiments, the lens holder 1 can be coupled to the circuit board 72 using an adhesive. For example, the adhesive can be applied on various portions of the attachment section 46 of the second portion 4, and the lens holder 1 can then be adhesively attached to a bottom portion 78 of the circuit board 72. The alignment pins 64 abut the circuit board 72 and align the lens holder 1 with the circuit board 72 when the lens holder 1 is coupled to the circuit board 72 as described above. Once the lens holder 1 is secured to the camera assembly 8, the second portion 4 protects the lens assembly 6 from infrared radiation.

The illustrated lens holder 1 is produced using injection molding, and preferably using either a two-step injection molding method or a co-injection method. The two-step injection method includes molding one of the portions 2, 4 in one mold and then transferring that portion to a second mold for overmolding with the other portion 2, 4. For example, in the exemplary embodiment, the second portion 4 is injection molded first and is then moved to another mold where the first portion 2 is then overmolded directly onto the second portion 4. The co-injection method includes molding one portion first and then molding the second portion next using the same tool/mold.

When producing the lens holder 1 using the two-step injection or the co-injection method, the molding process should warm the one portion 2, 4 to a temperature where the plastic material is almost in a liquid-like state. This temperature will vary based on the type of plastic used in the molding process. The one portion 2, 4 is then cooled down slightly and coupled to another portion 2, 4, which is also warmed. Where the sections of the first and second portions 2, 4 are in contact with each other when coupled together in the nested relation, as described above, the first and second portions 2, 4 will form chemical bonds in those contact locations. The bonding can only occur when the first and second portions 2, 4 are warm enough to form a chemical bond. This temperature is dependent on what type of plastic is used. The strength of the bond is dependent on the plastic materials used for the first and second portions 2, 4. For example, if the first portion 2 is molded from optically transmissive PBT-GF30 and the second portion 4 is molded from carbon black PBT-GF30, the chemical bond between the first and second portions 2, 4 would be substantially stronger than if the first portion 2 was, for example, made from nylon and the second portion 4 was made from polythene. The chemical bond between the first and second portions 2, 4 makes the lens holder 1 behave like a single piece when molding is completed. However, it is not necessary for the first and second portions 2, 4 to be chemically bonded. For example, the first and second portions can be coupled together in nested relation by using fasteners (e.g., screws), adhesives, snap-fit configurations, or by other mechanical means.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

Various features of the invention are set forth in the following claims.

What is claimed is:

1. A lens holder configured to receive a portion of a lens assembly and to be laser welded to a camera housing, the lens holder comprising:
   a first portion made of a first plastic material capable of being laser welded to a camera housing; and
   a second portion made of a second plastic material capable of blocking infrared radiation,
   wherein the first portion and the second portion are molded together in nested relation prior to receiving the lens assembly, with the second portion being at least partly inside the first portion to form an integrated lens holder assembly configured to receive the portion of the lens assembly and be laser welded to the camera housing.

2. The lens holder of claim 1, wherein the first plastic material is optically transmissive of the infrared wavelength.

3. The lens holder of claim 1, wherein the second plastic material includes carbon black material.

4. The lens holder of claim 1, wherein the first portion further includes a flange.

5. The lens holder of claim 4, wherein the flange is laser welded to a housing of the camera assembly.

6. The lens holder of claim 1, wherein the first portion includes at least one boss and the second portion includes at least one through hole, and wherein the at least one boss is received in the at least one through hole.

7. The lens holder of claim 6, wherein at least one fastener is received in a hole of the at least one boss.

8. The lens holder of claim 7, wherein the at least one fastener couples the lens holder to a circuit board of the camera assembly.

9. The lens holder of claim 1, wherein the first portion further includes a first cylindrical body having a shoulder and the second portion includes a second cylindrical body.

10. The lens holder of claim 9, wherein the second cylindrical body is received in the first cylindrical body in nested relation.

11. The lens holder of claim 10, wherein a distal end of the second cylindrical body abuts and is supported on the shoulder of the first cylindrical body, and wherein a radially inner surface of the shoulder is flush with a radially inner surface of the second cylindrical body.

12. The lens holder of claim 9, wherein a bottom portion of the first cylindrical body is laser welded to a lens assembly of the camera assembly.

13. The lens holder of claim 1, wherein the second portion includes at least one pin that abuts a circuit board of the camera assembly when the lens holder is coupled to the circuit board, and wherein the at least one pin is configured to align the lens holder with the circuit board during assembly.

14. The lens holder of claim 1, wherein the lens holder is coupled to a circuit board of the camera assembly using an adhesive.

15. The lens holder of claim 1, wherein the first portion and the second portion are chemically bonded together during molding.

16. A method of producing a lens holder configured to receive a portion of a lens assembly and to be laser welded to a camera housing, the method comprising;
   molding a first portion from a first plastic material capable of being laser welded to a camera housing;
   molding a second portion from a second plastic material capable of blocking infrared radiation; and
   wherein molding the first and second portions includes molding the first portion and the second portion together in nested relation prior to receiving the lens assembly, with the second portion being at least partly inside the first portion to form an integrated lens holder assembly configured to receive the portion of the lens assembly and be laser welded to the camera housing.

17. The method of claim 16, wherein the first portion and the second portion are molded together within the same injection molding machine.

18. The method of claim 16, wherein the first plastic material is optically transmissive of the infrared wavelength and the second plastic material includes carbon black material to block infrared radiation.

19. The method of claim 16, wherein the second portion is molded first and the first portion is overmolded onto the second portion.

20. A lens holder comprising:
   a first portion made of a first plastic material capable of being laser welded to a camera assembly; and
   a second portion made of a second plastic material capable of blocking infrared radiation,
   wherein the first portion and the second portion are coupled together in nested relation; and
   wherein the first portion includes at least one boss and the second portion includes at least one through hole, and wherein the at least one boss is received in the at least one through hole.

21. The lens holder of claim 20, wherein at least one fastener is received in a hole of the at least one boss.

22. The lens holder of claim 21, wherein the at least one fastener couples the lens holder to a circuit board of the camera assembly.

* * * * *